United States Patent [19]
Bella et al.

[11] Patent Number: 6,139,194
[45] Date of Patent: Oct. 31, 2000

[54] FIBER OPTIC LIGHTING SYSTEM CONNECTOR

[75] Inventors: Joseph J. Bella, Wheaton; Donald J. Broomfield, Elgin; William J. Olson, Barrington, all of Ill.

[73] Assignee: Illinois Tool Works Inc., Glenview, Ill.

[21] Appl. No.: 09/186,688

[22] Filed: Nov. 5, 1998

[51] Int. Cl.[7] .................................................. G02B 6/36
[52] U.S. Cl. .......................... 385/73; 385/77; 385/75; 385/58; 385/62; 385/53; 362/551; 362/581
[58] Field of Search ............................ 385/77, 78, 75, 385/80, 81, 58, 62, 53, 73; 362/551, 581

[56] References Cited

U.S. PATENT DOCUMENTS

| | | |
|---|---|---|
| 3,996,189 | 12/1976 | Travnicek . |
| 4,682,849 | 7/1987 | Kowata et al. . |
| 4,704,660 | 11/1987 | Robbins . |
| 4,780,510 | 10/1988 | Uemiya et al. . |
| 4,782,430 | 11/1988 | Robbins . |
| 4,957,347 | 9/1990 | Zarian . |
| 5,052,778 | 10/1991 | Jamshid . |
| 5,058,985 | 10/1991 | Davenport et al. . |
| 5,067,831 | 11/1991 | Robbins et al. . |
| 5,080,460 | 1/1992 | Erdman et al. . |
| 5,095,517 | 3/1992 | Monguzzi et al. . |
| 5,122,580 | 6/1992 | Zarian et al. . |
| 5,149,467 | 9/1992 | Zarian . |
| 5,221,387 | 6/1993 | Robbins et al. ............................ 385/53 |
| 5,225,166 | 7/1993 | Zarian et al. . |
| 5,298,327 | 3/1994 | Zarian et al. . |
| 5,315,684 | 5/1994 | Szegda . |
| 5,337,390 | 8/1994 | Henson et al. . |
| 5,381,500 | 1/1995 | Edwards et al. . |
| 5,418,874 | 5/1995 | Carlisle et al. . |
| 5,425,120 | 6/1995 | Peterson et al. . |
| 5,452,186 | 9/1995 | Dassanayake . |
| 5,530,940 | 6/1996 | Ludwig, Jr. et al. . |
| 5,647,658 | 7/1997 | Ziadi . |
| 5,668,904 | 9/1997 | Sutherland et al. . |
| 5,960,139 | 9/1999 | Henning ..................................... 385/78 |
| 6,022,150 | 2/2000 | Erdman et al. ............................ 385/62 |

*Primary Examiner*—Cassandra Spyrou
*Assistant Examiner*—Fayez Assaf

[57] ABSTRACT

A fiber optic lighting system connector for coupling a fiber optic cable to another fiber optic cable, or a light source, or a light fixture. The connector includes a sleeve member having an axial bore for receiving a fiber optic cable, and a cap having an axial bore for receiving the fiber optic cable. The cap is rotatably coupled to the sleeve member, and a first ramped surface of the sleeve member is engagable with a plurality of fingers extending flexibly into the axial bore of the cap to move the plurality of fingers radially inwardly toward the fiber optic cable upon rotation of the cap. One or more teeth protruding from one or more of the plurality of fingers are engagable with the fiber optic cable to axially bias the fiber optic cable into the axial bore of the sleeve member toward another fiber optic cable, or toward a light source or light fixture conductor member retained in the axial bore of the sleeve member.

29 Claims, 6 Drawing Sheets

FIBER OPTIC LIGHTING SYSTEM CONNECTOR

BACKGROUND OF THE INVENTION

The invention relates generally to fiber optic lighting systems, and more particularly to fiber optic lighting system connectors.

Fiber optic lighting systems are known and include generally one or more fiber optic cables for transmitting visible light from a source to one or more environment illuminating fixtures. The light is typically emitted from a halogen, or metal halide, or other broad spectrum source, and is transmitted through one or more fiber optic cables having a light transmitting core covered by an outer coaxial cladding, whereby the refractive index of the core is greater than that of the cladding to internally reflect light transmitted therethrough. In some fiber optic cables, the core is a PMMA material and the cladding is a TEFLON material. The cladding is usually covered by a protective coaxial outer sheath, or jacket, and may include a yarn or other strengthening material therebetween. Fiber optic cables suitable for lighting system applications have a diameter in a range generally between approximately 2 mm and approximately 25 mm, although the diameter may be more or less depending on the particular application requirements. The light fixtures include generally lenses and other devices coupled to the fiber optic cable for emitting, and sometimes diffusing, light where desired. In some applications, the fiber optic cable itself is oriented or modified to emit light directly therefrom, for example from an end portion thereof, or from exposed portions of the core along its axial length.

Fiber optic lighting systems have many advantages over conventional lighting systems, and are an attractive alternative for many applications. A single light source in a fiber optic lighting system may supply light through multiple fiber optic cables coupled to corresponding light emitting fixtures. This configuration has great potential for substantially reducing maintenance associated with changing multiple light bulbs required in conventional lighting systems. In aircraft passenger cabins, for example, a single light source located in a readily accessible equipment bay may power multiple overhead or aisle or other cabin light fixtures, thereby eliminating laborious and costly disassembly of interior panels required to replace conventional light bulbs.

Fiber optic lighting systems are also capable of isolating heat and undesirable wavelengths, particularly those in the ultraviolet portion of the spectrum, from the light emitting fixture. Thus fiber optic lighting systems are useful in applications where it is desirable eliminate the heat generated by conventional lighting systems, and in applications where ultraviolet radiation is of concern. For example, heat and ultraviolet radiation generated by conventional lighting systems may adversely affect food products illuminated thereby resulting in melting or early spoilage thereof. Fiber optic lighting systems are also useful in applications where it is desirable to isolate electrical equipment from the illuminated environment to reduce electromagnetic interference and to eliminate electrical hazards, for example in the lighting of swimming pools and other water bodies. Fiber optic lighting systems are also desirable for many other applications.

The potential application of fiber optic lighting systems however remains largely unrealized in part for inefficiencies associated with the transmission of power between the light source and the light emitting fixtures. Some power loss occurs as light propagates along the length of the fiber optic cable, and it is estimated that existing, commercially available, fiber optic cables lose approximately 2 percent of the transmitted power per linear foot of cable. Advances in materials science however are expected to substantially reduce these losses in the near future. Another source of power loss in fiber optic lighting systems, and that with which the present invention is concerned primarily, is associated with the mechanical coupling of fiber optic cables generally, and more particularly the connecting of fiber optic cables to light sources, and to other fiber optic cables, and to light emitting fixtures.

Known fiber optic lighting system connectors include the application of an epoxy, or more generally an adhesive, and/or shrink wrap materials about abutting fiber optic cable end portions. The application of adhesive however is time consuming and usually requires an assembly device to temporarily hold the cable end portions in axially abutting alignment until the adhesive hardens. The application of adhesive may also require heat or a radiation source to facilitate curing. Adhesive does have the advantage of filling gaps between the abutting cable portions, which tend to have relatively rough surfaces that otherwise reduce the efficacy of power transmission thereacross. Adhesives however often have different refractive properties, or indices, than fiber optic cables and conductor members of the light source and fixture, resulting in additional power loss, which is undesirable.

Shrink wrapping abutting end portions of fiber optic cables is less costly and time consuming than some adhesive couplings, but shrink wrapped couplings are generally relatively lossy since abutting cable end portions have a tendency to separate axially, thereby forming air gaps therebetween, which are a significant source of power loss. Shrink wrap materials are used often in combination with adhesives. However, neither shrink wrap nor adhesives are reusable since the coupling formed thereby must usually be destroyed to disassemble the fiber optic cable end portions, which may be damaged also.

Other known prior art connectors used in fiber optic lighting systems include adaptations from other technologies, which perform only marginally well. The SKINTOP II liquid tight strain relief cord connector available from Olflex Wire & Cable, Inc. Fairfield, N.J., for example, has been employed to couple fiber optic cables to light sources. The SKINTOP II connector includes generally a collet disposed about the fiber optic cable, and a sealing nut disposed about the cable and engaged with a first threaded outer surface portion of the collet. A tapered surface of the sealing nut urges axial finger members of the collet radially inwardly into clamping engagement with the fiber optic cable. A second outer threaded surface portion of the collet is coupled to the light source, thereby holding the fiber optic cable in abutting relation relative to a mating light conducting portion of the light source.

The SKINTOP II connector is designed for electrical applications, and includes a sealing member between the finger members and the fiber optic cable disposed therethrough. The SKINTOP II connector however does not bias the end portion of the fiber optic cable axially toward and into engagement with the mating end portion of the light source. Absent such an axial bias, it is not possible to eliminate power reducing air gaps, or occlusions, formed between the end of the fiber optic cable and the mating end portion of the light source when the SKINTOP II is used in fiber optic lighting systems.

Other known prior art connectors adapted from other technologies for use in fiber optic lighting systems include a multiple-component pneumatic conduit connector available from the John Guest Company, Madison, Wis. This connector includes a body member having a bore therethough for accommodating mating conduit end portions and portions of a corresponding collet disposed thereabout. The collets have several metal teeth formed in corresponding flexible fingers thereof which bite into the conduits. The metal teeth are required apparently to engage either metal or plastic fluid conduits coupled by the connector. For this purpose, a c-shaped spring clip disposed between an outer flange of the collet and an end portion of the body member urges the collet axially outwardly from the bore of the body member, thereby engaging the teeth of the finger members with the conduit. As the collet is drawn axially out the body member by the spring clip, however, so too is the conduit engaged by the teeth thereof, resulting in formation of an air gap between the end portions of abutting conduits. Thus, the John Guest connector does not axially bias the conduit end portions into mating engagement. The John Guest connector also includes an o-ring disposed between each conduit and the body member to form a fluid tight seal between the abutting end portions thereof, so that any spacing between the conduit end portions is not a concern in fluid coupling applications, for which the John Guest connector was designed. In fiber optic cable coupling applications, however, the John Guest connector provides a less than desirable coupling for its inherent tendency to formation of air gaps between abutting fiber optic cable portions. The John Guest connector is also relatively costly to manufacture, due in part to the metal teeth which must be formed in the plastic collet by insert molding or other means, and in part due to the many components and required assembly thereof.

U.S. Pat. No. 5,668,904 issued Sep. 1, 1997 to Sutherland et al. and entitled "Fiber Optic Cable Connector Apparatus and Method" discloses a communications fiber optic cable connector frame designed to mate with a communications industry standard connector block. A fiber optic cable is disposed coaxially in a grooved or threaded bore of a retaining collet, and the retaining collet has a threaded outer surface disposed in a threaded bore of the connector frame. An unthreaded tapered portion of the bore in the connector frame applies a radially inwardly directed force on the retaining collet as the collet is engaged therewith, to resist tension forces that tend to separate the fiber optic cable therefrom. A compressed spring disposed about an end portion of the connector frame and acting between a radial flange thereof and a cap disposed axially thereabout biases the connector frame and the fiber optic cable retained therein toward the connector block. The connector frame however is relatively complex for its many components, particularly the cap and spring assembly required to axially bias the cable toward the connector block, and is costly to manufacture. Moreover, the connector frame of U.S. Pat. No. 5,668,904 was designed specifically for coupling with a communications industry standard connector block.

The present invention is drawn toward advancements in the art of fiber optic lighting systems, and more particularly to fiber optic lighting system connectors, and combinations thereof.

It is an object of the invention to provide novel connectors for fiber optic lighting systems and combinations thereof that overcome problems in the prior art.

It is another object of the invention to provide novel fiber optic lighting system connectors having any one or more advantages over the prior art, including improved power transmission efficiency, improved economy, relative ease of assembly and disassembly, fewer components, reduced complexity, elimination of adhesives or epoxies, elimination of special tools for assembly, and interchangeable components, among other advantages disclosed more fully herein.

It is a more particular object of the invention to provide novel fiber optic lighting system connectors that axially bias a fiber optic cable end portion toward an end portion of a light source, or toward the end portion of another fiber optic cable, or toward a light fixture axially retained or biased axially in an opposing direction in the connector to provide an improved coupling therebetween.

It is another object of the invention to provide novel fiber optic lighting system connectors having a coupling medium disposable between a fiber optic cable end portion and a conductor member to provide improved light transmission therebetween, and a related object of the invention to provide a unitary coupling medium that also provides a seal between the connector and the fiber optic cable end portion and conductor member.

It is another object of the invention to provide novel fiber optic lighting system connectors that rotationally fix one or more fiber optic cable end portions therein during coupling therebetween.

It is still another more particular object of the invention to provide novel fiber optic lighting system connectors useable for coupling a fiber optic cable to another fiber optic cable, or to a conductor member of a light source or a light fixture. The connector comprises generally a sleeve member having an axial bore for receiving the fiber optic cable or conductor member, and a cap having an axial bore for also receiving the fiber optic cable or conductor member. The cap is rotatably coupled to the sleeve member, and a first ramped surface of the sleeve member is engagable with a plurality of fingers extending flexibly into the axial bore of the cap to move the plurality of fingers radially inwardly toward the fiber optic cable or conductor member upon rotation of the cap. One or more teeth protruding from one or more of the plurality of fingers are engagable with the fiber optic cable or conductor member to axially move the fiber optic cable or conductor member into the axial bore of the sleeve member toward another fiber optic cable, or toward a light source or light fixture conductor member retained axially, or biased in an opposing axial direction, in the axial bore of the sleeve member.

These and other objects, aspects, features and advantages of the present invention will become more fully apparent upon careful consideration of the following Detailed Description of the Invention and the accompanying Drawings, which may be disproportionate for ease of understanding, wherein like structure and steps are referenced generally by corresponding numerals and indicators.

BRIEF DESCRIPTION OF THE DRAWINGS

FIG. 4a is an end view along lines a—a of FIG. 3a.

FIG. 4b is an end view along lines b—b of FIG. 3a.

FIG. 6b is a partial sectional view along lines b—b of FIG. 6a.

DETAILED DESCRIPTION OF THE INVENTION

Figure 1:
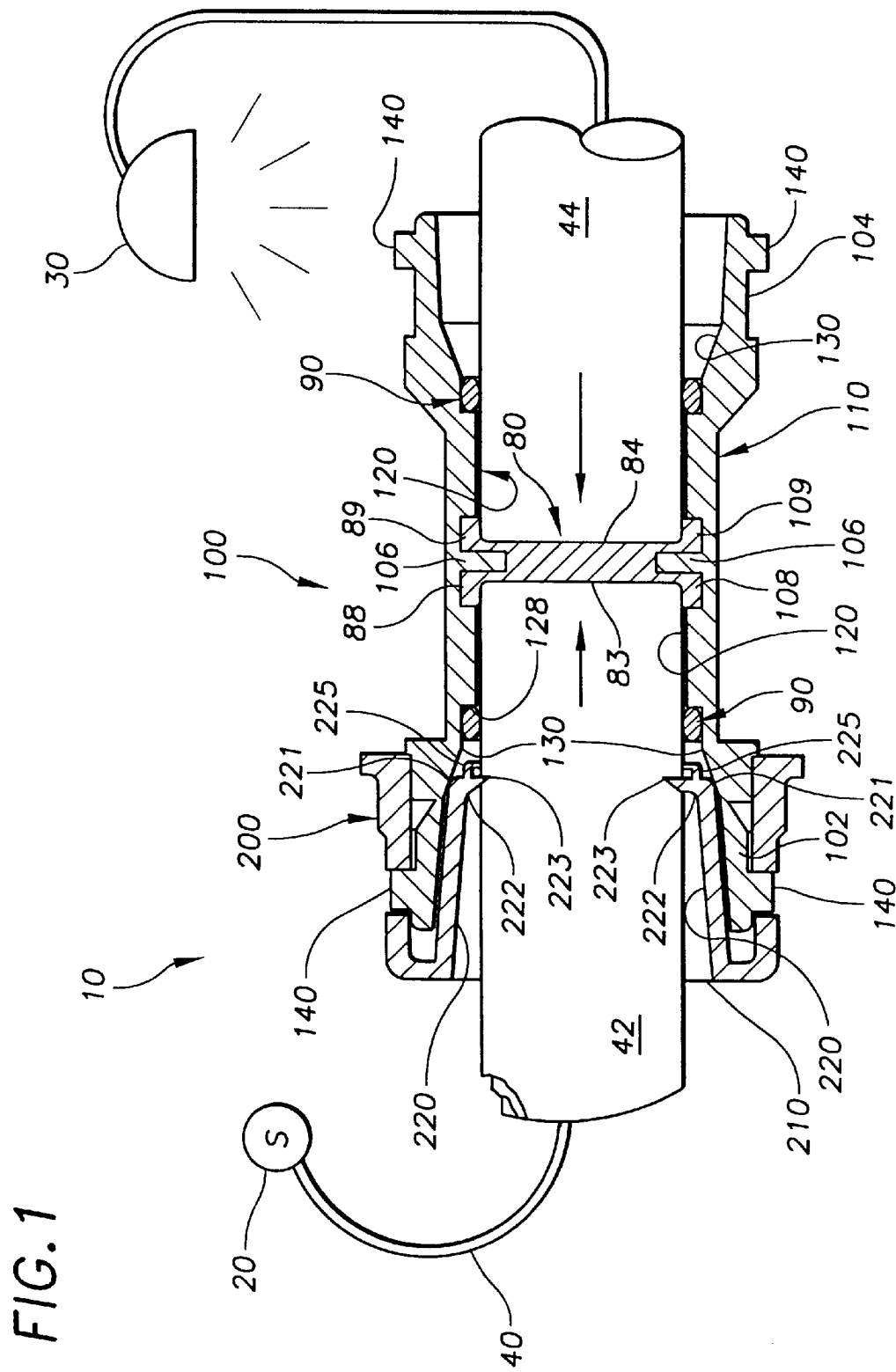
FIG. 1 is a partial sectional view of a fiber optic lighting system having a fiber optic cable connector according to an exemplary embodiment of the invention.

FIG. 1 is a schematic view of a fiber optic lighting system 10 comprising generally a light source 20 coupled to a light fixture 30 by a fiber optic cable 40. More generally, the light source 20 may supply light to multiple light fixtures through corresponding fiber optic cables, not shown but known generally. The light source 20 may be any source suitable for use in fiber optic lighting systems, for example a halogen or metal halide or a broad spectrum light source. The light fixture 30 may also be any light emitting and/or light diffusing fixture, or the light source 30 may be the fiber optic cable itself oriented or modified to emit the light directly therefrom, for example from an end portion thereof, or from exposed portions of the fiber optic core along its axial length.

FIG. 1 illustrates a fiber optic cable connector 100 retaining and coupling a first fiber optic cable end portion 42 and another light transmitting conductor member 44, both of which are disposed and retained axially in the connector 100, as discussed below. The light transmitting conductor member 44 may be another fiber optic cable end portion, or a conductor member end portion of a light source or of a light fixture. The fiber optic cable connector 100 is thus useable generally to couple a fiber optic cable to another fiber optic cable, or to a light source, or to a light fixture.

In the present specification, including the claims thereof, references to a "light transmitting conductor member" or merely a "conductor member" encompass any one of a fiber optic cable end portion, and a conductor member end portion of a light source or of a light fixture, and more generally any light transmission member since all are equivalent for transmission of light in fiber optic lighting systems, and may be coupled by the connector 100 of the present invention.

FIG. 1 illustrates the fiber optic cable connector 100 comprising generally a sleeve member 110 having an axial bore 120 for receiving the first fiber optic cable end portion 42 and the conductor member 44. In the exemplary embodiment, the sleeve member 110 is generally elongate, and the axial bore 120 is disposed fully therethrough preferably along a relatively linear path between opposing first and second end portions 102 and 104 thereof. More generally, the sleeve member 110 is not necessarily elongate, and may have any shape. Also, the axial bore 120 may be non-linear, or somewhat curved, whereby the fiber optic cable end portion 42 and the conductor member 44 enter the sleeve member 110 at an angle therebetween. These alternative configurations are possible since fiber optic cables are generally flexible, and may thus be inserted and fed along a curved path relatively easily. The conductor member of a light source or light fixture may also be flexible, and thus easily disposed along a curved axial bore of the sleeve member 110.

Figure 2:
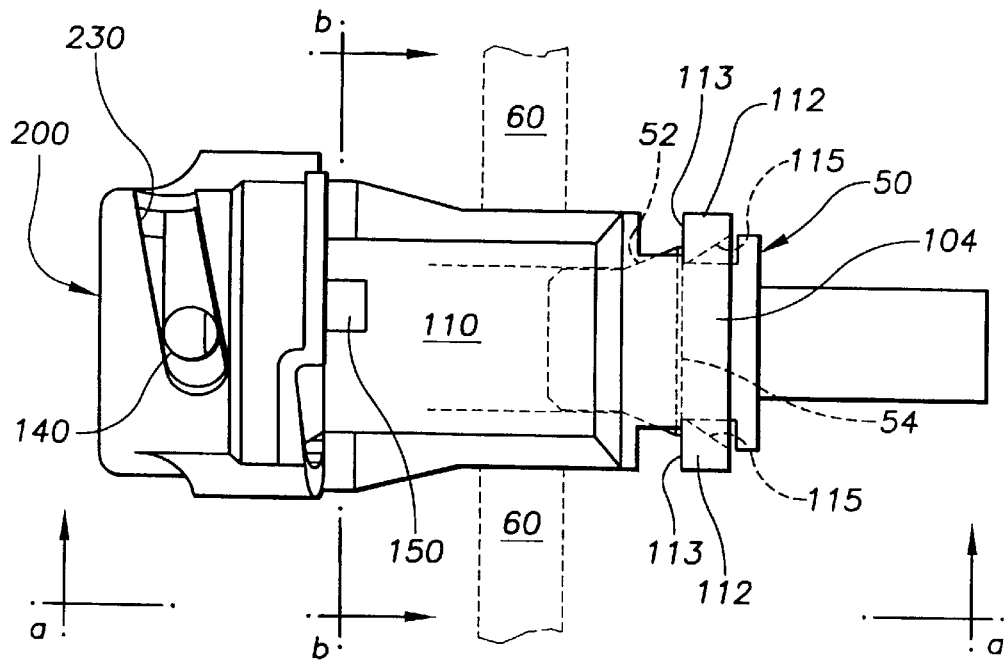
FIG. 2 is an alternative fiber optic connector sleeve member portion useable for coupling a fiber optic cable and a conductor member of a light source or a light fixture.

In many applications, a light source is located in a walled enclosure, and it is desirable to couple one or more fiber optic cables to a conductor member of a light source through the wall thereof, or more generally through a bulkhead. FIG. 2 illustrates the sleeve member 110 mounted in or formed integrally with a bulkhead portion 60, illustrated in phantom lines, for through bulkhead coupling between a fiber optic cable end portion and a conductor member.

Generally, in FIG. 1, the fiber optic cable end portion 42 is movable axially along the axial bore 120 of the sleeve member 110 toward the conductor member 44 to form an efficient fiber optic coupling therebetween. The conductor member 44 is either axially fixed in the axial bore 120 of the sleeve member, or is movable axially toward the fiber optic cable end portion 42 along the axial bore 120 of the sleeve member 110, particularly in embodiments where the conductor member 44 is a second fiber optic cable end portion, as discussed further below.

Figure 3A:
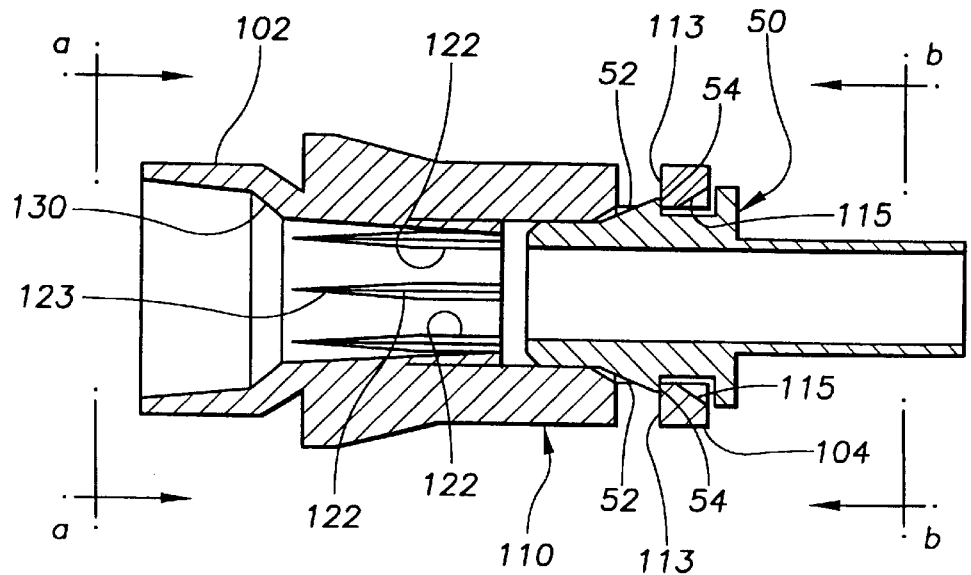
FIG. 3a is a partial sectional view along lines a—a of FIG. 2.

In the alternative embodiment of FIGS. 2 and 3a, the sleeve member 110 is configured for receiving a fiber optic cable end portion and a conductor member of a light source or a light fixture having an end portion configured as a ferule 50. The conductor member of a fiber optic light source may, for example, be one of many other conductor members, not shown, extending therefrom in an octopus arm like configuration for coupling to corresponding fiber optic cables, wherein each conductor member has a ferule 50 formed on an end portion thereof for coupling to a corresponding sleeve portion.

In some applications, it is sometimes desirable to prevent rotation of one or both of the fiber optic cable end portion 42 and the conductor member 44 in the axial bore 120 of the sleeve member 110. Preventing rotation of the fiber optic cable end portion and the conductor member in the sleeve member 110 eliminates or at least substantially reduces the formation of air gaps, or occlusions, therebetween by ensuring proper rotational alignment thereof, particularly where one or both end surfaces of the end portion 42 and conductor member 44 are cut or otherwise formed in a manner that requires rotational alignment. Preventing rotation of the fiber optic cable end portion 42 and the conductor member 44 in the sleeve member 110 may also prevent scratching or other damage to mating end surfaces thereof resulting from particulate matter that may be lodged therebetween. Rotationally fixing the fiber optic cable end portion 42 and the conductor member 44 in the sleeve member 110 thus provides generally more efficient light transmission coupling therebetween.

To prevent rotation of the fiber optic cable end portion 42 and the conductor member 44, the sleeve member 110 may include a protuberance extending radially inwardly from the axial bore 120 thereof for engaging one or both the fiber optic cable end portion 42 and conductor member 44 in a manner that prevents rotation thereof yet permits axial movement thereof along the axial bore 120 of the sleeve member 110 for purposes discussed further below. In FIGS. 3a, 3b, 4a and 4b, a plurality of generally wedge shaped rib members 122 are aligned axially and extend radially inwardly from the axial bore 120 of the sleeve member to engage one or both of the fiber optic cable end portion 42 and conductor member 44 to prevent rotation thereof in the sleeve member 110.

Figure 4A:
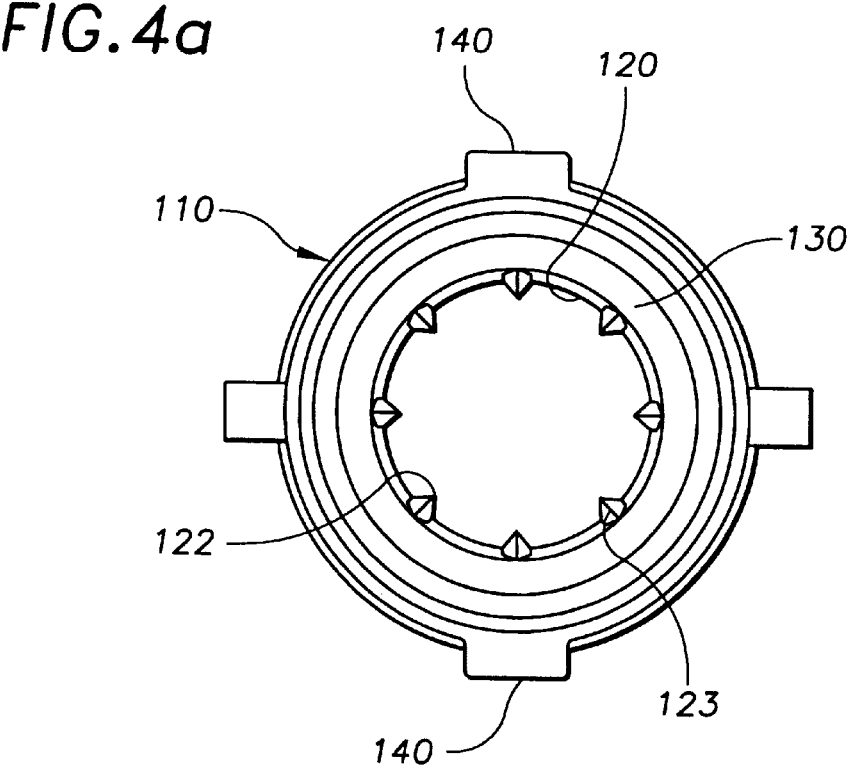

The wedge shaped rib members 122 are shaped and sized to cut into the fiber optic cable end portion and/or the conductor member along the longitudinal dimension thereof as the fiber optic cable end portion and conductor member are disposed into the axial bore 120. FIGS. 3a and 4a illustrate a leading end portion of the wedge shaped members 122 also having a wedge shaped surface 123 to facilitate insertion of the fiber optic cable end portion into the axial bore 120 of the sleeve member 110. A similar wedge shaped surface may be disposed on the opposing end of the wedge shaped members 122 to facilitate insertion of the conductor member into the axial bore 120 from an opposing end portion of the sleeve member 110.

Figure 3B:
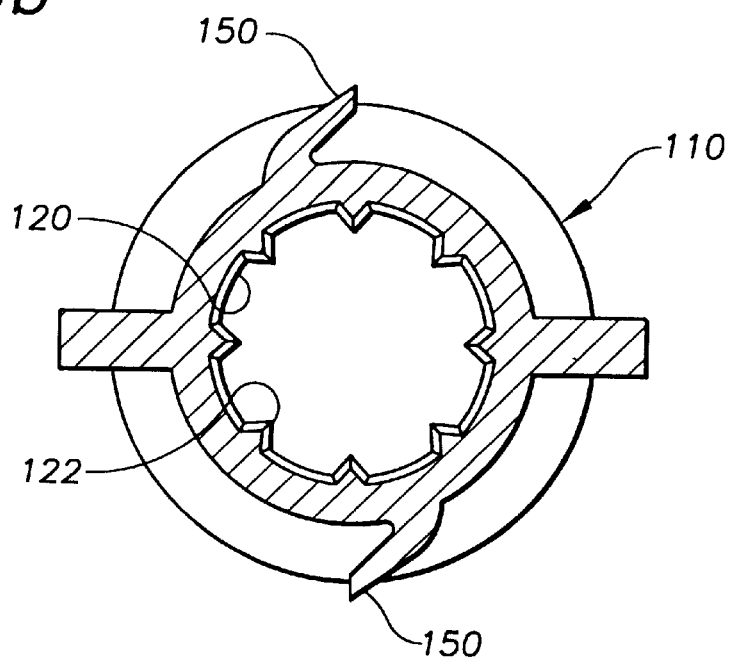
FIG. 3b is a partial sectional view along lines b—b of FIG. 2.
Figure 4B:
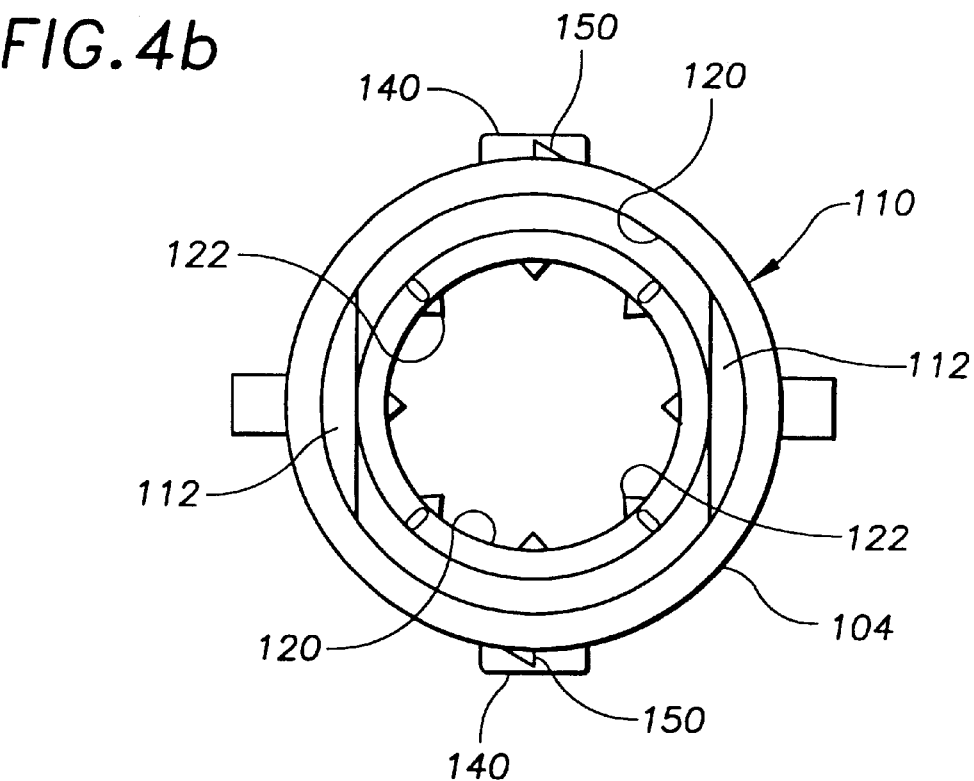

The conductor member of a light source or a light fixture, for example the ferule 50, may also be retained non-rotationally in the axial bore 120 thereof, as discussed above, and is preferably fixed, or retained, axially in the axial bore 120 of the sleeve member 110. In FIGS. 2 and 3a, the ferule 50 comprises an outwardly extending flange having a leading wedge shaped surface 52 and a trailing edge 54. FIG. 4b illustrates one or more resilient engagement members 112 protruding into the axial bore 120 proximate a second end 104 of the sleeve member 110. FIGS. 2 and 3a illustrate the engagement members 112 forming corresponding recesses with corresponding engagement surfaces 113, and FIG. 3b illustrates the engagement members 112 having tapered leading surfaces 115. As the ferule 50 is inserted into the axial bore 120, the leading wedge shaped surface 52 thereof initially engages the tapered leading surfaces 115 and outwardly flexes the resilient engagement members 112 protruding into the axial bore 120 to permit axial passage of the ferule 50. In FIG. 3a, after the wedge shaped surface 52 of the ferule 50 is inserted into the axial passage beyond the engagement members 112, the engagement members 112 flex back inwardly so that an outer portion of the flange of the ferule 50 partially protrudes into the corresponding recesses, whereby portions of the trailing edge 54 are engaged with portions of the engagement surfaces 113 to axially retain the ferule 50 in the axial bore 120 of the sleeve member 110, also illustrated partially in FIG. 2.

In some applications it is desirable to provide a moisture or dust seal in the connector 100, and more particularly to prevent moisture or dust from contaminating the coupling between the fiber optic cable end portion 42 and the conductor member 44. In FIG. 1, a corresponding sealing member 90 is disposed about the fiber optic cable end portions 42 and 44 in the axial bore 120 of the sleeve member 110 to form a seal therebetween. The sealing member 90, or seal, is for example a generally o-ring shaped resilient member disposed in a corresponding recess, or seat 128, formed in the axial bore 120 of the sleeve member 110. A sealing member may also be disposed about the ferule 50 in the axial bore 120 of the sleeve member 110 to form a seal therebetween.

FIG. 1 illustrates the connector 100 further comprising a coupling medium 80 disposed in the axial bore 120 of the sleeve member 110 and between the fiber optic cable end portion 42 and the conductor member 44, which are positioned axially and preferably biased into engagement therewith from opposing sides thereof to eliminate or at least substantially reduce occlusions therebetween. The coupling medium 80 may also be disposed between the fiber optic cable end portion 42 and the ferule 50 of FIG. 2, though not illustrated. The resilient coupling medium 80 generally improves the efficiency of light transmission between the fiber optic cable end portion 42 and the conductor member 44.

The coupling medium 80 preferably has a refractive index that is the same as, or at least substantially the same as, a refractive index of the fiber optic cable end portion 42 and conductor member 44 retained and coupled in the connector 100, thereby further improving the light transmission efficiency therebetween. The coupling medium 80 is preferably resilient to maintain firm contact with the fiber optic cable end portion 42 and the conductor member 44 between which it is disposed. The coupling medium 80 also has preferably a relatively low hardness, for example a Shore hardness rating between approximately 25 and approximately 40, though these ratings are not intended to be limiting, and the hardness rating may be more or less depending on the particular application requirements. In one exemplary embodiment, the coupling medium 80 is an optical grade silicone material having a Shore hardness rating of approximately 25.

Figure 7A:
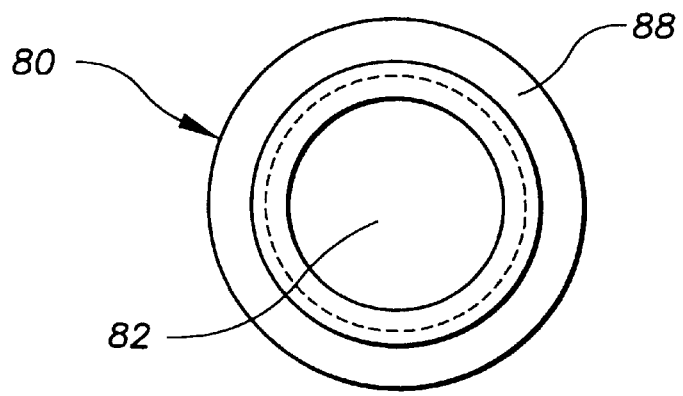
FIG. 7a is an end view of a coupling medium.

FIGS. 1 and 7a illustrate the coupling medium 80 comprising principally a disk shaped portion 82 disposed between the fiber optic cable end portion 42 and the conductor member 44. In one embodiment illustrated in FIG. 7b, the disk shaped portion 82 has generally convex surfaces on opposing end portions 83 and 84 thereof prior to installation between the fiber optic cable end portion 42 and the conductor member 44. FIG. 1 illustrates the disk shaped coupling medium 80 after installation, wherein the opposing ends 83 and 84 thereof are compressed relatively flat to fill any voids thus forming a relatively continuous light transmitting medium between the fiber optic cable end portion 42 and the conductor member 44.

Figure 7B:
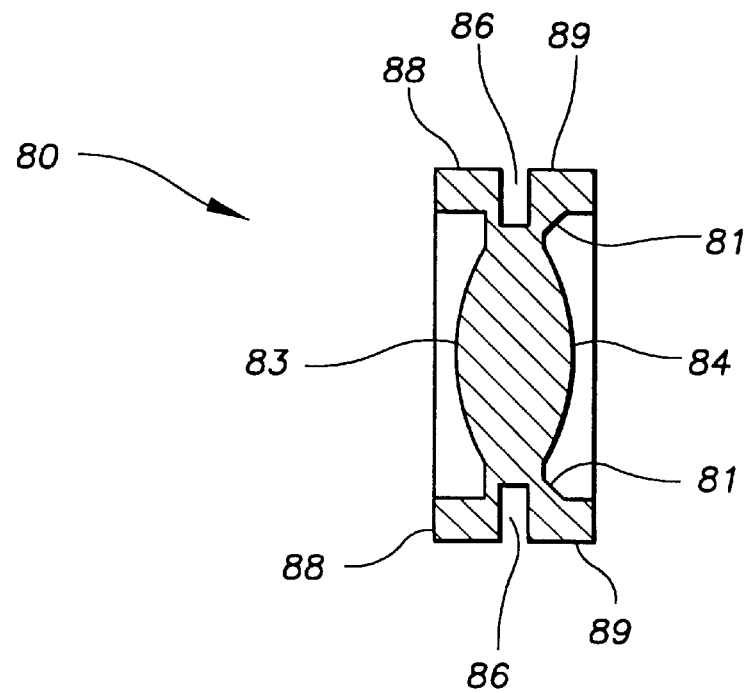
FIG. 7b is a sectional side view of a coupling medium prior to assembly.

In one embodiment, a disk shaped coupling medium is retained in the axial bore 120 of the sleeve member 110 between the fiber optic cable end portion 42 and the conductor member 44. The coupling medium 80 is preferably retained in the sleeve member 110 by structure in the axial bore 120 to prevent separation of the coupling medium 80 therefrom during handling and assembly, for example in one or more recesses disposed about the axial bore 120. FIGS. 1 and 7b illustrate the coupling medium 80 having first and second recess portions 86 disposed on opposing outer portions thereof, and preferably an annular shaped recess disposed continuously thereabout for accommodating corresponding abutment members 106, which may alternatively be a single continuous member, protruding into the axial bore 120 of the sleeve member 110. The abutment members or member 106 provide a stop against which the fiber optic cable end portion 42 and the conductor member 44 abut, and locate and retain the coupling medium 80 in the axial bore 120. The coupling medium 80 may be disposed manually in the axial bore 120 of the sleeve member 110, or alternatively and preferably may be insert molded therein. Thus the coupling medium 80 may be securely disposed and retained in the sleeve member 110 prior to assembly of the fiber optic cable end portion 42 and the conductor member 44 therewith.

FIGS. 1 and 7b also illustrate generally first and second generally annular sealing members 88 and 89 disposed about and formed integrally with the disk shaped member 82, on opposing sides of the first and second recess portions 86 in embodiments so configured. In FIG. 1, the first and second generally annular sealing members 88 and 89 are disposed and seated in corresponding first and second annular recesses 108 and 109 formed in the axial bore 120 of the sleeve member 110, and in the exemplary embodiment on opposing sides of the abutment members or member 106. The first and second annular sealing members 88 and 89 are disposable about the fiber optic cable end portions 42 and conductor member 44, respectively, in the axial bore 120 of the sleeve member 110 to form a seal therebetween. In one embodiment, the annular sealing members may include a contoured surface 81 to better conform with the particular end shape of the conductor member and to provide improved sealing contact therewith. The first and second generally annular sealing members 88 and 89 function equivalently to the sealing members 90 discussed above, and may thus be used as an alternative thereto. The first and second generally annular sealing members 88 and 89 may be formed unitarily with the disk shaped member 82 in a molding operation, and are preferably simultaneously insert molded in the corresponding recesses 108 and 109 when the disk shaped member 82 is molded in the sleeve member 110 as discussed above.

In embodiments where a coupling medium 80 is disposed between the fiber optic cable end portion 42 and conductor member 44, it is particularly desirable to prevent or at least reduce rotation of the fiber optic cable end portion and the conductor member, as discussed above, to prevent damage to the coupling medium caused generally by differing rotational forces, or torques, applied to opposing ends thereof in contact with the fiber optic cable end portion 42 and the conductor member 44.

Figure 6A:
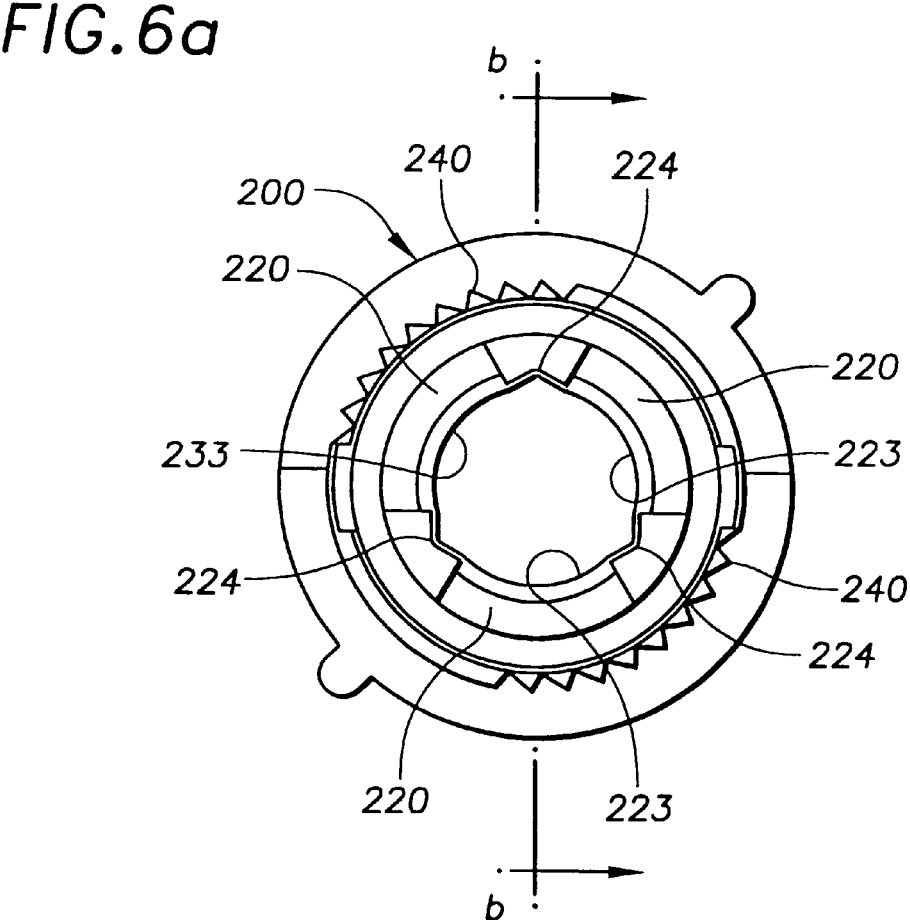
FIG. 6a is an end view along lines a—a of FIG. 5.
Figure 6B:
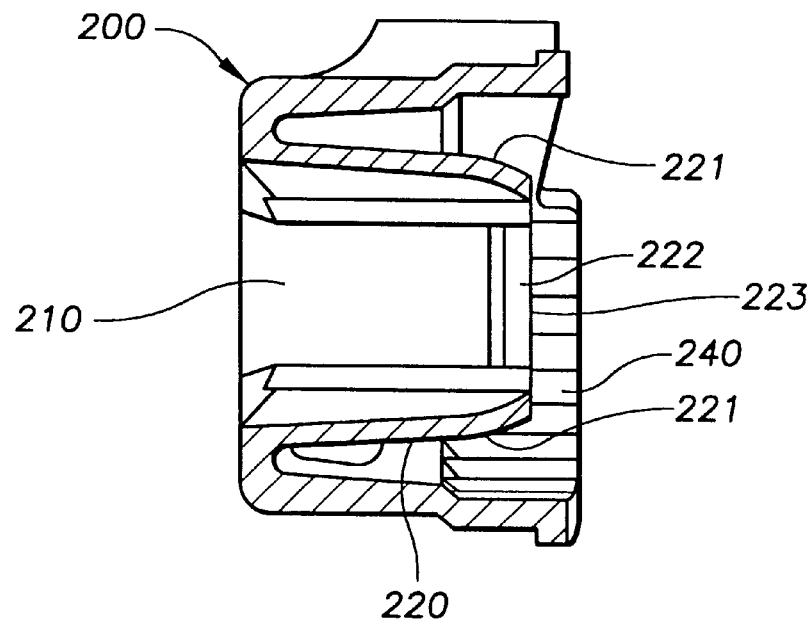

FIG. 1 also illustrates a first cap 200 rotatably coupled to the sleeve member 110, and having an axial bore 210 for receiving the fiber optic cable end portion 42 or more generally a conductor member, which is also disposed in the axial bore 120 of the sleeve member 110. FIGS. 1, 6a and 6b illustrate the cap 200 including a plurality of at least two fingers 220 extending flexibly into the axial bore 210 thereof, though this exemplary configuration is not intended to be limiting, and the cap 200 may have more than the three flexible fingers 220 illustrated in FIG. 6a. At least one of the plurality of fingers has one or more corresponding teeth protruding generally radially therefrom into the axial bore 210 of the cap 200, and in the exemplary embodiment each of the plurality of fingers 220 includes a corresponding tooth 222 so configured on an end portion thereof. In alternative embodiments, however, multiple teeth, which may be protrusions or ridges extending generally radially inwardly toward the axial bore 210, are disposed along one or more of the flexible fingers 220, preferably near the distal end portion thereof so that the teeth are engageable with a fiber optic cable end portion or more generally a conductor member, as discussed further below.

Figure 5:
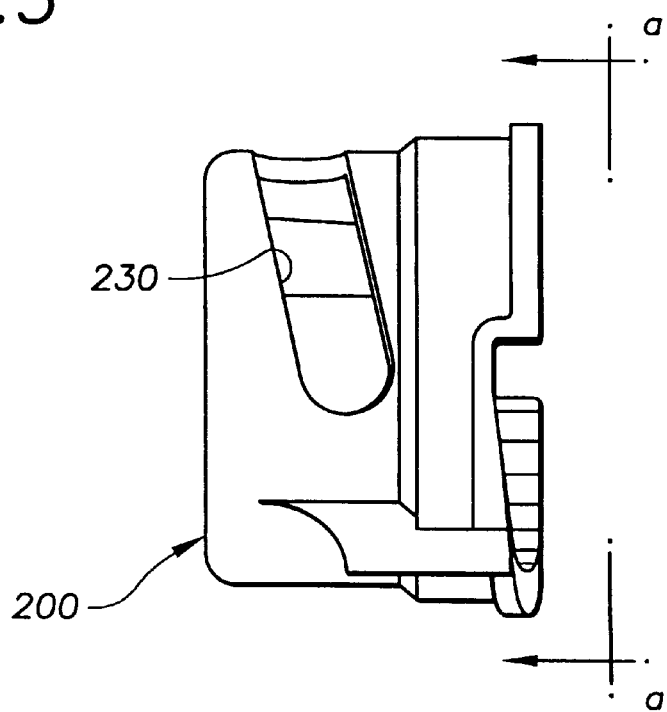
FIG. 5 is a fiber optic cable cap portion.

FIGS. 2 and 5 illustrate a first helical guide 230 formed in a side wall portion of the cap 200. A second helical guide shaped similarly, but not shown, is preferably formed in a corresponding, generally opposing side wall portion of the cap 200. In the exemplary embodiment, the helical guide 230 extends fully through the side wall portion of the cap 200, but in other embodiments the helical guide 230 may be no more than a recess on an inner side of the side wall portion. The helical guides form generally a screw thread on the cap 200 for threaded engagement thereof with an end portion of the sleeve member 110, as discussed further below. Thus an equivalent of the helical guides 230 is a screw thread formed on the inner side wall portion of the cap, though the exemplary helical guides 230 are particularly suitable for forming the cap from a plastic material in a molding operation.

FIGS. 1, 2, 4a and 4b illustrate first and second cap engagement members 140 protruding generally radially from generally opposing exterior portions of the sleeve member 110 near the first end portion 102 thereof for engagement with the cap 200. FIG. 1 also illustrates first and second cap engagement members 140 disposed on the second end portion 104 thereof. The first and second cap engagement members 140 protrude into a corresponding one of the first and second helical guides 230 in the cap 200 to rotatably retain the cap 200 on the end portion of the sleeve member 110, whereby the cap 200 is movable axially toward the sleeve member 110 upon relative rotation therebetween. In the exemplary embodiment, the cap 200 is formed of a resilient plastic material, for example in a molding operation, and is flexible to form a generally oval shaped axial bore 210 opening to permit insertion of the cap engagement members 140 into the helical guides 230 of the cap 200, thus rotatably retaining the cap 200 on the sleeve member 110.

As discussed, the cap 200 is formed preferably in a molding operation. FIG. 6a illustrates a first flexible web 224 disposed between and connecting adjacent fingers 220 to reduce mold complexity, and more particularly to eliminate the requirement for complex shut-offs in the molding operation, yet still allow the plurality of fingers 220 to remain flexible, which is required to engage and retain the fiber optic cable, or more generally a conductor member therein, as discussed further below.

FIG. 1 also illustrates the cap 200 including a flange 225 disposed on an end portion of one or more fingers 220 radially outwardly of the tooth 222 to locate and retain the sealing member 90 in the recess 128 of the sleeve member 110, as discussed above.

FIGS. 1, 3a and 4a illustrate the sleeve member 110 including a first ramped surface 130 in the axial bore 120 thereof, which transitions or tapers from a larger opening of the axial bore 120 near the end portion 102 of the sleeve member 110 to a smaller opening thereof moving inwardly from the end portion 102 of the sleeve member 110. In the exemplary sleeve member 110 of FIG. 1, a similar ramped portion 130 is also disposed near the second end portion 104 thereof.

FIG. 1 illustrates the ramped surface 130 of the sleeve member 110 engagable with the plurality of fingers 220 of the cap 200, and more particularly with an outer portion 221 thereof generally opposite any tooth protruding therefrom, illustrated in FIG. 6b, to move the first plurality of fingers 220 radially inwardly toward the fiber optic cable end portion 42 upon rotation of the cap 200 coupled to the sleeve member 110 in a direction that moves, or advances, the cap 200 axially toward the sleeve member 110.

The plurality of fingers 220 are generally engagable with the fiber optic cable end portion 42 when the plurality fingers 220 move radially inwardly, thereby constrictably clamping, or engaging, and retaining the fiber optic end portion 42 in the axial bore 210 of the cap 200, which is rotatably coupled to the sleeve member 110. The plurality of fingers 220 also tend to position the fiber optic cable end portion 42 concentrically in the axial bore 210 of the cap 200.

As the plurality fingers 220 are constricted radially inwardly, the teeth 222 thereof bite into, or also engage, the fiber optic cable end portion 42. Thus, upon rotation of the cap 200 so that it advances toward the sleeve member 110, the plurality of fingers 220 and particularly teeth 222 thereof, engage the fiber optic cable end portion 42 and move the fiber optic cable end portion 42 axially toward the sleeve member 110 along with the cap 200, whereby the fiber optic cable end portion 42 moves into the axial bore 120 of the sleeve member 110 with the axial advancement of the cap 200.

In embodiments that include one or more protruding members 122 in the axial bore 120 of the sleeve member 110 to prevent rotation of the fiber optic cable end portion 42, the fiber optic cable end portion remains rotationally fixed in the axial bore 210 of the cap 200 during rotational advancement thereof. FIGS. 6a and 6b illustrate the teeth 222 of the plurality of fingers 220 having a generally curved edge 223 that cuts into the outer sheath, or jacket, of the fiber optic cable without adversely affecting the light transmitting properties thereof. As the cap 200 is rotated, the curved edges 223 slice into and about the rotationally fixed fiber optic cable, thereby engaging and substantially fixing the fiber optic cable end portion 42 relative to the cap 200. As the cap 200 is further advanced axially upon rotation thereof about the outer portion of the sleeve member 110, the rotationally fixed fiber optic cable end portion 42, now engaged by the teeth 222 of the cap 200, is advanced in the axial bore 120 of the sleeve member 110. A conductor member 44 disposed and engaged by the cap 200 is similarly advanced in the axial bore 120 of the sleeve member 110.

The cap 200 thus firmly engages and moves the fiber optic cable end portion 42 axially into the axial bore 120 of the sleeve member 110 and into contact with a conductor member 44, either directly or indirectly depending upon whether there is a coupling medium 80 disposed therebetween as discussed above. Since the conductor member 44 is also fixed in the sleeve member 110, and in some applications biased axially toward the fiber optic cable end portion 42, the coupling between the fiber optic cable end portion 42 and the conductor member 44 is relatively free of air gaps or occlusions therebetween. In embodiments that include a resilient coupling medium 80 between the fiber optic cable end portion 42 and the conductor member 44, the resilient coupling medium 80 is deformably compressed therebetween flattening the convex ends 83 and 84 thereof, thereby increasing contact therewith and further reducing occlusions therebetween.

The cap 200 also maintains an axial bias on the fiber optic cable end portion 42 toward and into direct or indirect contact with the conductor member 44. This bias is particularly advantageous in embodiments that include a resilient coupling medium 80, since the fiber optic cable end portion moved axially in the axial bore 120 of the sleeve member 110 tends to compressibly deform the resilient coupling medium 80 thereby increasing contact therewith and reducing occlusions therebetween.

FIG. 1 illustrates the sleeve member 110 having a second end portion 104 configured generally as a mirror image of the first end portion 102 thereof for receiving a second cap, not shown, that retains and biases the conductor member 44 into the axial bore 120 of the sleeve member 110, as discussed generally above, and toward the first fiber optic cable end portion 42 also disposed in the axial bore 120 thereof. As discussed, the conductor member 44 in FIG. 1 may be another fiber optic cable end portion, or a conductor member end portion of a light source or light fixture, which may also be advanced axially into the sleeve member 110. In many applications, the conductor member end portion of a light source or light fixture is more likely to be configured as a ferule 50, which is axially and possibly rotationally fixed in the sleeve member, illustrated in FIG. 2.

FIGS. 2, 3b and 4b illustrate the sleeve member 110 comprising flexible ratcheting members 150 protruding from generally opposing exterior portions thereof. Generally, the sleeve member 110 has at least one flexible ratcheting member, although plural ratcheting members may be disposed radially thereabout. FIGS. 6a and 6b illustrate the cap 200 having a plurality of ratcheting serrations 240 arranged in two groups disposed on generally opposing portions of the axial bore 210 thereof for engagement by the flexible ratcheting member 150 over some range of rotational movement between the cap 200 and the sleeve member 110. In alternative embodiments, the plurality of ratcheting serrations 240 may extend continuously about the full inner circumference of the axial bore 210. The plurality of ratcheting serrations 240 are located generally for engagement with the ratcheting member or members 150 upon rotation of the cap 200 coupled to the sleeve member 110. The ratcheting member or members 150 may be formed unitarily on the sleeve member 110 and plurality of ratcheting serrations 240 may be formed unitarily on the cap 200 in molding operations, discussed above generally.

The flexible ratcheting members 150 lockingly engage the plurality of serrations 240 to permit one-way rotation of the cap 200 about the end portion of the sleeve member 110 in a direction that moves or advances the fiber optic cable end portion 42 or conductor member 44 into the axial bore 120 thereof. The ratcheting member or members 150 and plurality of ratcheting serrations 240 cooperate to prevent the cap 200 from loosening from the sleeve member 110 subsequent to tightening, thereby maintaining application of an axial force, or bias, on the fiber optic cable end portion 42 or conductor member 44. The ratcheting member or members 150 and plurality of ratcheting serrations 240 cooperate to provide for incrementally adjusting the bias and retention of the fiber optic cable end portion 42 in the axial bore 120 of the sleeve member 110. The incremental adjustability provided by the ratcheting member or members 150 and plurality of ratcheting serrations 240 facilitates consistent bias adjustment of the fiber optic cable end portion 42 in the axial bore 120 of the sleeve member 110 toward the conductor member 44.

In the exemplary embodiment, the cap 200 is formed preferably of a resilient plastic material, and is flexible to form a generally oval shaped axial bore 210 opening to disengage the ratcheting members 150 from the ratcheting serrations 240, thereby permitting rotation of the cap 200 in a direction that releases the radially inwardly constriction of the fingers 220 and disengages the teeth 222 from the fiber optic cable end portion 42 or from the conductor member 44.

While the foregoing written description of the invention enables one of ordinary skill to make and use what is considered presently to be the best mode thereof, those of ordinary skill will appreciate and acknowledge the existence of variations, combinations, and equivalents of the specific exemplary embodiments herein. The invention is therefore to be limited not by the exemplary embodiments, but by all embodiments within the scope and spirit of the appended claims.

What is claimed is:

1. A fiber optic cable connector useable for coupling a first fiber optic cable end portion to a light transmitting conductor member, comprising:

a sleeve member having an axial bore for receiving a first fiber optic cable end portion so that the first fiber optic cable end portion is movable axially in the axial bore of the sleeve member;

a first ramped surface in the axial bore of the sleeve member;

a first cap having an axial bore for receiving the first fiber optic cable end portion, the first cap rotatably coupled to the sleeve member;

a first plurality of fingers extending flexibly into the axial bore of the first cap, at least one of the first plurality of fingers having a corresponding first tooth engagable with the first fiber optic cable end portion disposed in the axial bore of the first cap, the first ramped surface of the sleeve member engagable with the first plurality of fingers of the first cap to move the first plurality of fingers radially inwardly toward the first fiber optic cable end portion upon rotation of the first cap coupled to the sleeve member, the first tooth engagable with the first fiber optic cable end portion when the first plurality of fingers move radially inwardly toward the first fiber optic cable end portion to axially move the first fiber optic cable end portion into the axial bore of the sleeve member.

2. The connector of claim 1 further comprising at least one protuberance extending radially inwardly from the axial bore of the sleeve member, the protuberance engagable with the first fiber optic cable end portion disposed in the axial bore of the sleeve member to prevent rotation of the first fiber optic cable end portion upon rotation of the first cap coupled to the sleeve member.

3. The connector of claim 2 further comprising the protuberance is a plurality of generally wedge shaped rib members aligned axially and extending radially inwardly from the axial bore of the sleeve member, the plurality of generally wedge shaped rib members engagable with the first fiber optic cable end portion disposed in the axial bore of the sleeve member.

4. The connector of claim 1 further comprising a first flexible web disposed between and connecting adjacent first fingers of the first plurality of fingers of the first cap.

5. The connector of claim 1 further comprising at least one flexible ratcheting member protruding from an exterior of the sleeve member, and a first plurality of ratcheting serrations disposed on the axial bore of the first cap, the ratcheting member engagable with the first plurality of ratcheting serrations upon rotation of the first cap coupled to the sleeve member.

6. The connector of claim 1 further comprising first and second helical guides formed in corresponding side wall portions of the first cap, and first and second cap engagement members protruding from the exterior of the sleeve member, the first and second cap engagement members protruding into a corresponding one of the first and second helical guides in the first cap to rotatably retain the first cap on the sleeve member, the first cap movable axially toward the sleeve member upon rotation thereof.

7. The connector of claim 1 further comprising:

a second ramped surface in the axial bore of the sleeve member, the conductor member disposable in the axial bore of the sleeve member;

a second cap having an axial bore for receiving the conductor member, the second cap rotatably coupled to the sleeve member;

a second plurality of fingers extending flexibly into the axial bore of the second cap, at least one of the second plurality of fingers having a corresponding second tooth engagable with the conductor member disposed in the axial bore of the second cap, the second ramped surface of the sleeve member engagable with the second plurality of fingers of the second cap to move the second plurality of fingers radially inwardly toward the conductor member upon rotation of the second cap coupled to the sleeve member, the second tooth engagable with the conductor member when the second plurality fingers move radially inwardly toward the conductor member to axially move the conductor member into the axial bore of the sleeve member toward the first fiber optic cable end portion disposed in the axial bore of the sleeve member.

8. The connector of claim 1 further comprising a first sealing member disposed in the axial bore of the sleeve member, the first sealing member disposable about the first fiber optic cable end portion to form a seal between the axial bore of the sleeve member and the first fiber optic cable end portion.

9. The connector of claim 7 further comprising a second sealing member disposed in the axial bore of the sleeve member, the second sealing member disposed about the conductor member to form a seal between the axial bore of the sleeve member and the conductor member.

10. The connector of claim 1 further comprising each of the first plurality of fingers has a corresponding first tooth engagable with the first fiber optic cable end portion disposed in the axial bore of the first cap when the first plurality fingers move radially inwardly toward the first fiber optic cable end portion to axially move the first fiber optic cable end portion into the axial bore of the sleeve member.

11. The connector of claim 1 further comprising the conductor member is a light source conductor member end portion disposed and retained axially in the axial bore of the sleeve member, the first fiber optic cable end portion disposed in the axial bore of the sleeve member movable axially toward the conductor member.

12. The connector of claim 11 further comprising the conductor member is a ferule having a flange with a leading wedge shaped surface and a trailing edge, the sleeve member having resilient engagement members protruding into the axial bore, the engagement members having corresponding engagement surfaces, the trailing edge of the ferule is engageable with the engagement surfaces upon disposing the leading wedge shaped surface of the ferule into the axial bore beyond the engagement members, whereby the ferule is retained axially in the sleeve member.

13. The connector of claim 1 further comprising a coupling medium disposed in the axial bore of the sleeve member, the first fiber optic cable end portion movable toward and biasable into engagement with the coupling medium upon axially moving the first fiber optic cable end portion into the axial bore of the sleeve member.

14. The connector of claim 13, the coupling medium is a resilient material having a refractive index substantially the same as a refractive index of the first fiber optic cable end portion and the conductor member, whereby the coupling medium is disposable between and in contact with the fiber optic cable end portion and the conductor member.

15. The connector of claim 13, the coupling medium comprises a unitary member having a generally disk shaped portion with first and second sealing members disposed thereabout and on opposing ends thereof, whereby the first and second sealing members are engageable with the axial bore of the sleeve member and a corresponding one of the fiber optic cable end portion and the conductor member to form seals therebetween.

16. A fiber optic lighting system comprising:

a light source;

a light fixture;

a fiber optic cable coupling the light source and the light fixture;

a sleeve member having an axial bore, a fiber optic cable end portion of the fiber optic cable disposed in and movable axially in the axial bore of the sleeve member, one of the light source and the light fixture having a conductor member end portion disposed and retained axially in the axial bore of the sleeve member;

a ramped surface on the axial bore of the sleeve member;

a cap having an axial bore for receiving the fiber optic cable end portion, the cap rotatably coupled to the sleeve member;

a plurality of fingers extending flexibly into the axial bore of the cap, at least one of the plurality of fingers having a corresponding tooth engagable with the fiber optic cable end portion, the ramped surface of the sleeve member engagable with the plurality of fingers of the cap to move the plurality of fingers radially inwardly toward the fiber optic cable end portion upon rotation of the cap coupled to the sleeve member, the tooth engagable with the fiber optic cable end portion when the plurality of fingers move radially inwardly toward the fiber optic cable end portion to axially move 20 the fiber optic cable end portion into the axial bore of the sleeve member and toward the conductor member.

17. The system of claim 15 further comprising a coupling medium disposed in the axial bore of the sleeve member between the conductor member and the fiber optic cable end portion, the conductor member and the fiber optic cable end portion moved toward and biased into engagement with the coupling medium.

18. The system of claim 17 further comprising the coupling medium is a resilient material having a refractive index substantially the same as a refractive index of the fiber optic cable end portion and the conductor member.

19. The system of claim 17 further comprising a plurality of generally wedge shaped rib members aligned axially and extending radially inwardly from the axial bore of the sleeve member, the plurality of generally wedge shaped rib member engagable with the fiber optic cable end portion disposed in the axial bore of the sleeve member to prevent rotation of the fiber optic cable end portion upon rotation of the cap coupled to the sleeve member, the conductor member axially fixed in the axial bore of the sleeve member.

20. The system of claim 16 further comprising at least one flexible ratcheting member protruding from an exterior of the sleeve member, and a plurality of ratcheting serrations disposed on the axial bore of the cap, the ratcheting member engagable with the plurality of ratcheting serrations upon rotation of the cap coupled to the sleeve member.

21. The system of claim 16 further comprising each of the plurality of fingers has a corresponding tooth engagable with the fiber optic cable end portion disposed in the axial bore of the cap when the plurality fingers move radially inwardly toward the fiber optic cable end portion to axially move the fiber optic cable end portion into the axial bore of the sleeve member.

22. The system of claim 16 further comprising first and second helical guides formed in corresponding side wall portions of the cap, and first and second cap engagement members protruding from the exterior of the sleeve member, the first and second cap engagement members protruding into a corresponding one of the first and second helical guides in the cap to rotatably retain the cap on the sleeve member, the cap movable axially toward the sleeve member upon rotation thereof.

23. A coupling medium useable for coupling a fiber optic cable end portion and a conductor member disposed in an axial bore of a fiber optic cable connector sleeve member, comprising:

a generally disk shaped portion having a first end portion and a generally opposing second end portion;

first and second generally annular sealing members disposed about and coupled to the generally disk shaped portion on opposing ends thereof, the generally disk shaped portion is disposable in the axial bore of the sleeve member between the fiber optic cable end portion and the conductor member to substantially reduce occlusions therebetween, and the first and second sealing members are engageable with the axial bore of the sleeve member and a corresponding one of the fiber optic cable end portion and the conductor member to form seals therebetween.

24. The coupling medium of claim 23 is a resilient material having a refractive index substantially the same as a refractive index of the fiber optic cable end portion and the conductor member.

25. The coupling medium of claim 23, the first and second end portions of the generally disk shaped portion are generally convex.

26. The coupling medium of claim 23 further comprising first and second recess portions disposed on opposing outer portions between the first and second generally annular sealing members, the first and second recess portions for accommodating corresponding abutment member portions protruding into the axial bore.

27. The coupling medium of claim 23 a unitary member formed of an optical grade silicone material.

28. The coupling medium of claim 23 in combination with the fiber optic cable connector sleeve member, and insert moldable in the axial bore thereof.

29. The coupling medium of claim 23 has a Shore hardness rating between approximately 25 and approximately 40.

* * * * *